United States Patent
Herbst et al.

(10) Patent No.: US 10,212,779 B1
(45) Date of Patent: Feb. 19, 2019

(54) COLOR-TUNABLE LIGHTING DEVICE AND METHOD

(71) Applicant: REVOLUTION LIGHTING TECHNOLOGIES, INC., Stamford, CT (US)

(72) Inventors: Joseph E. Herbst, Newberg, OR (US); Nicholas G. Preiser, Portland, OR (US); Ward Ramsdell, Hillsboro, OR (US)

(73) Assignee: Revolution Lighting Technologies, Inc., Stamford, CT (US)

( * ) Notice: Subject to any disclaimer, the term of this patent is extended or adjusted under 35 U.S.C. 154(b) by 0 days.

(21) Appl. No.: 15/788,252

(22) Filed: Oct. 19, 2017

(51) Int. Cl.
*H05B 33/08* (2006.01)
*H05B 37/02* (2006.01)

(52) U.S. Cl.
CPC ....... *H05B 33/086* (2013.01); *H05B 33/0812* (2013.01); *H05B 33/0821* (2013.01); *H05B 33/0863* (2013.01); *H05B 33/0869* (2013.01); *H05B 33/0896* (2013.01); *H05B 37/0245* (2013.01)

(58) Field of Classification Search
CPC ............ H05B 33/0812; H05B 33/0842; H05B 35/00; H05B 37/0218; H05B 33/0827; H05B 33/083; H05B 33/0857; H05B 33/086; F21Y 2115/10; F21Y 2113/00; G01J 3/0254; G01J 3/501
See application file for complete search history.

(56) References Cited

U.S. PATENT DOCUMENTS

| | | | | |
|---|---|---|---|---|
| 8,222,584 B2 * | 7/2012 | Rains, Jr. | .................. | F21S 2/00 250/205 |
| 8,836,243 B2 * | 9/2014 | Eisele | ................ | H05B 33/0857 315/152 |
| 8,928,249 B2 * | 1/2015 | Raj | .................... | H05B 33/0869 315/153 |
| 9,125,257 B2 * | 9/2015 | Eisele | ................ | H05B 33/0857 |
| 9,142,595 B2 * | 9/2015 | Hamer | ................ | H01L 27/3209 |
| 9,642,209 B2 * | 5/2017 | Eisele | ................ | H05B 33/0869 |
| 9,854,640 B2 * | 12/2017 | Hsia | .................... | H05B 33/0827 |

* cited by examiner

*Primary Examiner* — Vibol Tan
(74) *Attorney, Agent, or Firm* — Barlow, Josephs & Holmes, Ltd.

(57) ABSTRACT

A color-tunable lighting device and method is disclosed. The device includes a lighting component that has a first lighting element having a warm color temperature, and a second lighting element having a cool color temperature. The first and second lighting elements, together, have a combined color temperature and a combined lumen output. The device further includes a controller configured to apply a first power input to the first lighting element and a second power input to the second lighting element wherein the combined color-temperature of the first lighting element and the second lighting element may be tuned to a desired color temperature at a desired combined lumen output of the lighting component.

16 Claims, 16 Drawing Sheets

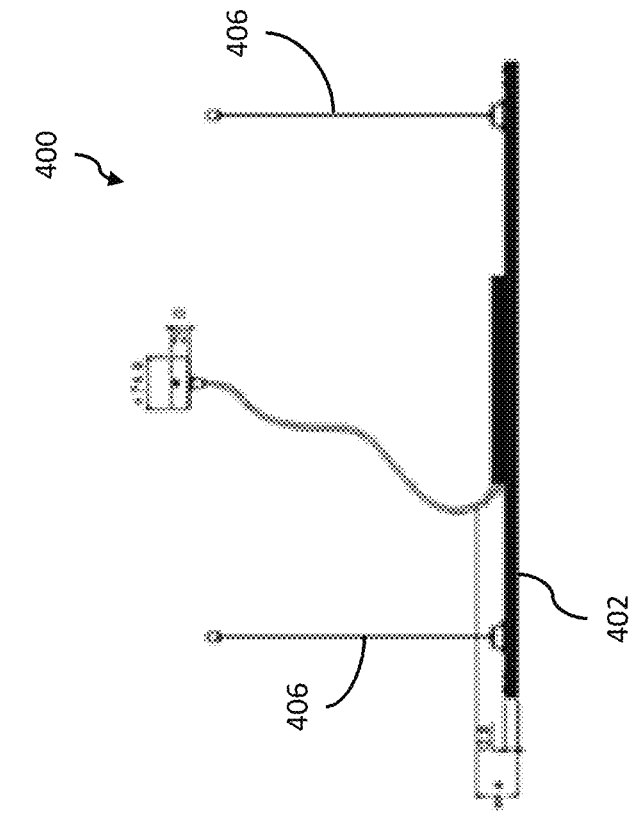
*FIG. 5C*
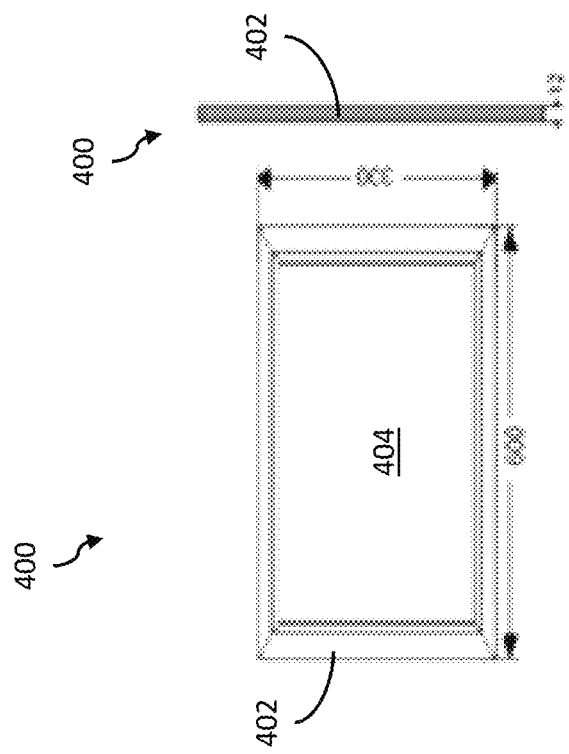
*FIG. 5B*
*FIG. 5A*

| Warm PWM 300Hz(Duty cycle) | Cool PWM 300Hz(Duty cycle) | Colour temperature(K) | Lumen |
|---|---|---|---|
| 0% | 100% | 6250 | 3012 |
| 5% | 95% | 5610 | 3011 |
| 10% | 90% | 5172 | 3008 |
| 15% | 85% | 4861 | 3007 |
| 20% | 80% | 4579 | 3005 |
| 25% | 75% | 4388 | 3005 |
| 30% | 70% | 4185 | 3004 |
| 35% | 65% | 4077 | 3002 |
| 40% | 60% | 3937 | 3001 |
| 45% | 55% | 3871 | 3000 |
| 50% | 50% | 3790 | 3000 |
| 55% | 45% | 3750 | 3000 |
| 60% | 40% | 3676 | 2999 |
| 65% | 35% | 3598 | 2999 |
| 70% | 30% | 3505 | 2998 |
| 75% | 25% | 3448 | 2996 |
| 80% | 20% | 3369 | 2994 |
| 85% | 15% | 3268 | 2993 |
| 90% | 10% | 3156 | 2991 |
| 95% | 5% | 3049 | 2990 |
| 100% | 0% | 3023 | 2990 |

COLOR-TUNABLE LIGHTING DEVICE AND METHOD

BACKGROUND OF THE INVENTION

1. Field of the Invention

The present disclosure relates generally to LED lighting fixtures and devices and more particularly to a lighting device and method with color temperature, brightness and color hue control.

2. Background of the Related Art

The light color and dimming quality of incandescent/halogen lighting luminaires and fixtures are prized in such settings as restaurants, hotel lobbies and guestrooms, ballrooms, theaters, and residential spaces. A class of products known as warm-dim luminaires mimic incandescent dimming performance. As with incandescent lamps, the light color becomes increasingly warm in appearance as the product dims. Because the color change of this type of product is linked to the dimming, a user cannot change the color of the light without dimming. Another class of products are white-tunable luminaires which are capable of linear white tuning using multiple LED in different color ranges. However, when this type of configuration is used, the mixed colors of white will lie relative to a black-body curve and will appear pinkish or purplish as they track from one color temperature (CCT) to the next. This tends to cause changes in light intensity along the color temperature spectrum. In many cases, users want to change the color of light from the fixture without changing the light output of the fixture. In these situations (such as in a conference room), it would be helpful to have the color-tunable control that is separate from the dimming control so that relative brightness may be maintained as the color-temperature is modified by a user. Further, emitting light with a color hue, is also desirable, for atmosphere, landscape lighting and displays, where the color hue of the lighting may be adjusted to a desired color hue. However, adjusting the color temperature, dimming, and color hue is challenging as complexities described above for color temperature alone are multiplied.

SUMMARY OF THE INVENTION

The color-tunable lighting device and method described herein solves the problems of the prior art by providing a lighting component that has a first lighting element having a warm color temperature, and a second lighting element having a cool color temperature. The first and second lighting elements, together, have a combine color temperature and a combined lumen output. The device further includes a controller configured to apply a first power input to the first lighting element and a second power input to the second lighting element wherein the combined color-temperature of the first lighting element and the second lighting element may be tuned to a desired color temperature at a desired combined lumen output of the lighting component. Further the device may include additional lighting elements having a color hue, where the color hue emitted by the lighting device is tunable to a desired color or color hue. With an additional lighting element having a particular color hue, the color of the lighting element may be varied for a particular color. With three additional lighting elements configured to emit primary colors, such as red, green and blue, any color hue may be emitted.

BRIEF DESCRIPTION OF THE DRAWINGS

These and other features, aspects, and advantages of the present invention will become better understood with reference to the following description, appended claims, and accompanying drawings where:

FIG. 5A is a bottom view of an example lighting device;

FIG. 5B is a side view of an example lighting device;

FIG. 5C is a side view of an alternative mounting arrangement for an example lighting device;

FIG. 6A is a chart of color and power profiles of the lighting elements of the lighting component of the lighting device and system described herein;

DESCRIPTION OF THE PREFERRED EMBODIMENTS

The following detailed description of exemplary implementations refers to the accompanying drawings. The same reference numbers in different drawings may identify the same or similar elements.

As will be described in greater detail below, the lighting device and method described herein inversely varies the power input to two lighting elements that have two distinct color temperatures, one warm and the other cool. By varying the power input inversely, the combined lighting effect of the light emitting from the warm lighting element and the cool lighting element may be tuned to a specific color temperature while maintaining the brightness (i.e. output lumens) of the lighting device.

As used herein, color temperature is a description of the warmth or coolness of a light source. When a piece of metal is heated, the color of light it emits will change. This color begins as red in appearance and graduates to orange, yellow, white, and then blue-white to deeper colors of blue. The temperature of this metal is a physical measure in degrees Kelvin or absolute temperature. While lamps other than incandescent such as LEDs do not exactly mimic the output of this piece of metal, the correlated color temperature (or Kelvins) is used to describe the appearance of that light source as it relates to the appearance of the piece of metal (specifically a black body radiator).

By convention, yellow-red colors (like the flames of a fire) are considered warm, and blue-green colors (like light from an overcast sky) are considered cool. Confusingly, higher Kelvin temperatures (3600-5500 K) are what we consider cool and lower color temperatures (2700-3000 K) are considered warm. Cool light is preferred for visual tasks because it produces higher contrast than warm light. Warm light is preferred for living spaces because it is more flattering to skin tones and clothing. A color temperature of 2700-3600 K is generally recommended for most indoor general and task lighting applications. Color Temperature is not an indicator of lamp heat.

Figure 1:
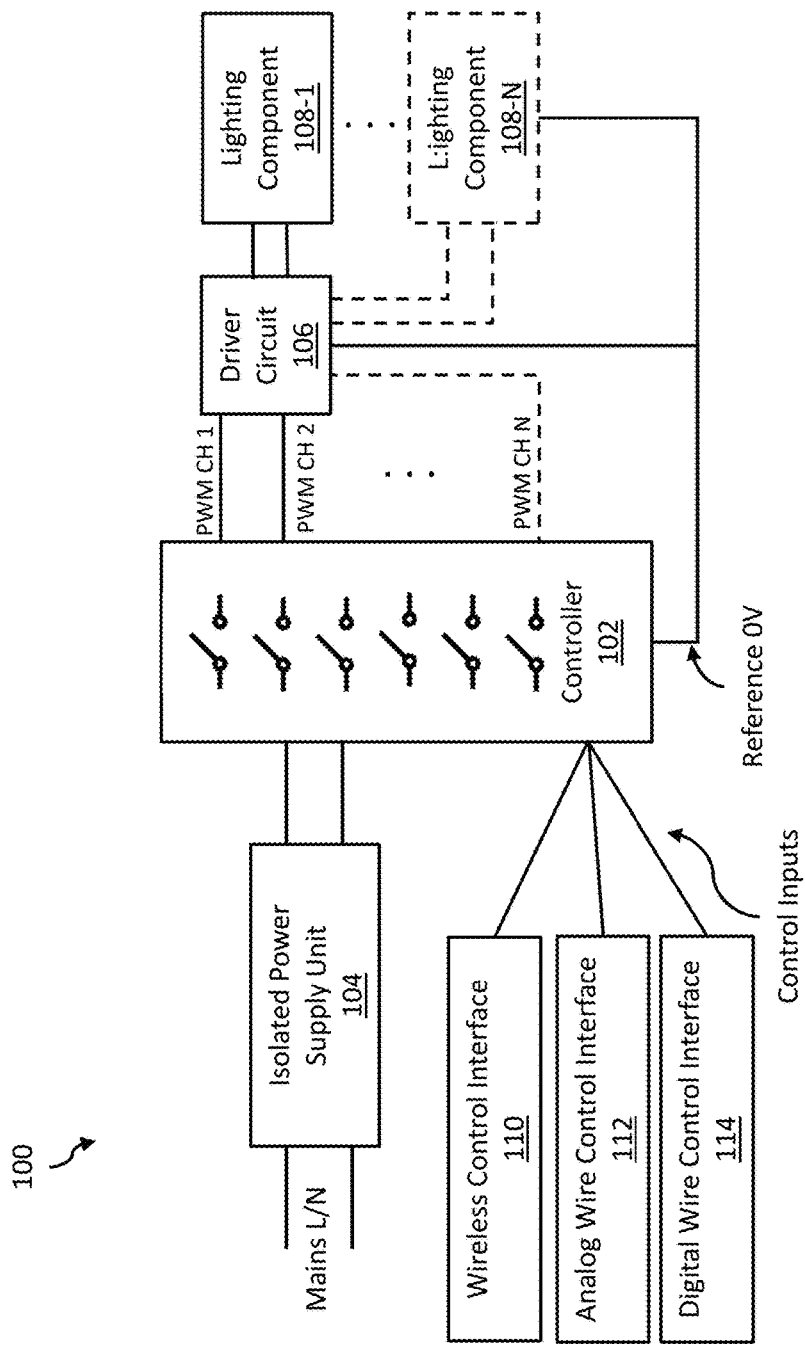
FIG. 1 is a diagram of an overview of the color-tunable lighting device and system described herein.

FIG. 1 is a diagram of an overview of a color-tunable lighting device 100 and system as described herein. The device 100 generally includes a controller 102, which receives power from an isolated power supply unit 104. The controller 102 is configured to control a driver circuit 106, which drives one or more lighting components 108-1 through 108-N, 108 collectively. Interaction with controller 102 may be through a wireless control interface 110, analog wire interface 112, and/or digital wire control interface 114.

In an example embodiment, controller 102 generates a VPWM control signal to drive the driver circuit 106 for each lighting component 108 connected to the system. The driver circuit 106 receives the VPWM control signal from the controller 102, and generates an output signal to modulate lighting elements 302, 304 of the lighting component 108 in accordance with the method and device described herein.

Wireless control interface 110 may include IEEE 802.11, Bluetooth, and/or other RF communications methods, such as ZigBee (IEEE 802.15.4) and Z-Wave and the like. A user may initiate commands to the device 100 with a mobile device, such as a smartphone and the like.

Analog wire control interface 112 may include push button and rotary control switches found in standard household and commercial wiring that controls existing lighting fixtures. For instance, a push-button rheostat may be used to toggle the lighting device 100 on and off, and further control the color temperature of the lighting component 108.

Digital wire control interface 114 may include wired internet connection, such as ethernet, using CAT-5 and CAT-6 wiring and RJ45 type connectors. Control signals from the digital wire controller 102 are received and converted to input signals, such as for example by pulse-width modulation, to drive the driver circuit 106.

Figure 2:
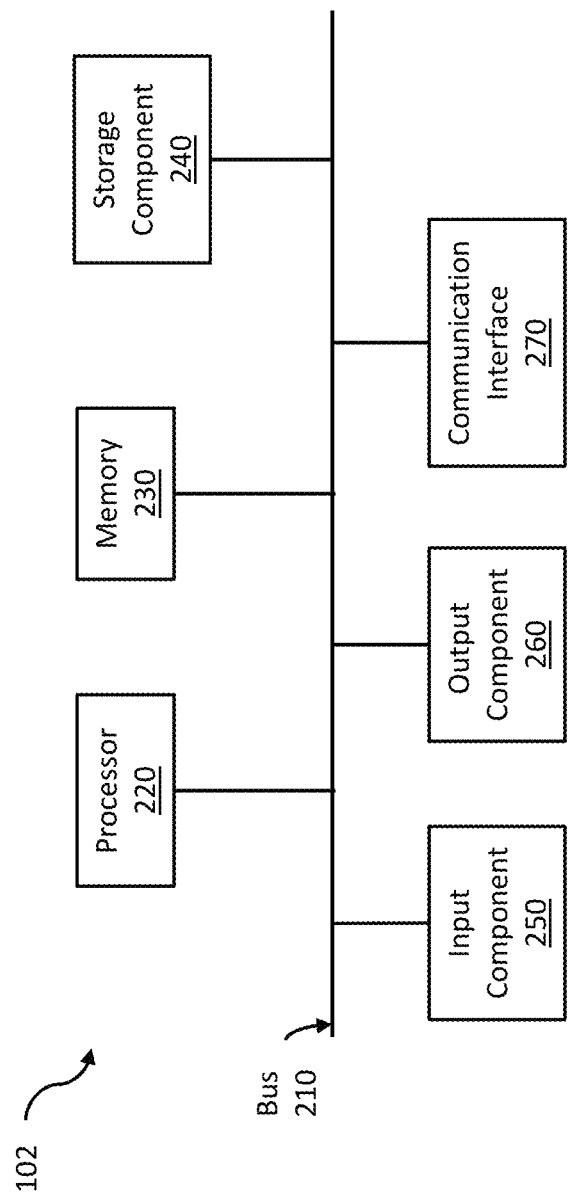
FIG. 2 is a diagram of a example components included in the color-tunable lighting device and system described herein.

FIG. 2 is a diagram of example components of a device 200. Device 200 may correspond to control system 102. In some implementations, user device 105, control system 102, and control station 104 may include one or more devices 200 and/or one or more components of device 200. As shown in FIG. 2, device 200 may include a bus 210, a processor 220, a memory 230, a storage component 240, an input component 250, an output component 260, and a communication interface 270.

Bus 210 may include a component that permits communication among the components of device 200. Processor 220 is implemented in hardware, firmware, or a combination of hardware and software. Processor 220 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 230 may include a random access memory (RAM), a read only memory (ROM), and/or another type of dynamic or static storage device (e.g., a flash memory, a magnetic memory, an optical memory, etc.) that stores information and/or instructions for use by processor 220.

Storage component 240 may store information and/or software related to the operation and use of device 200. For example, storage component 240 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 250 may include a component that permits device 200 to receive information, such as via user input (e.g., a touch screen display, a keyboard, a keypad, a mouse, a button, a switch, a microphone, etc.). Additionally, or alternatively, input component 250 may include a sensor for sensing information (e.g., a global positioning system (GPS) component, occupancy sensor, an accelerometer, a gyroscope, an actuator, etc.). Output component 260 may include a component that provides output information from device 200 (e.g., a display, a speaker, one or more light-emitting diodes (LEDs), etc.).

Communication interface 270 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 270 may permit device 200 to receive information from another device and/or provide information to another device, such as wireless control interface 110, analog wire control interface 112, and/or digital wire control interface 114. For example, communication interface 270 may include an Ethernet interface, including IEEE 802.3 power over ethernet, an optical interface, a coaxial interface, an infrared interface, a radio frequency (RF) interface, a universal serial bus (USB)

interface, a Wi-Fi interface, an IEEE 802.15.4 compliant interface, a Bluetooth interface, a cellular network interface, or the like.

Device 200 may perform one or more processes described herein. Device 200 may perform these processes in response to processor 220 executing software instructions stored by a computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figures 3, 4A:
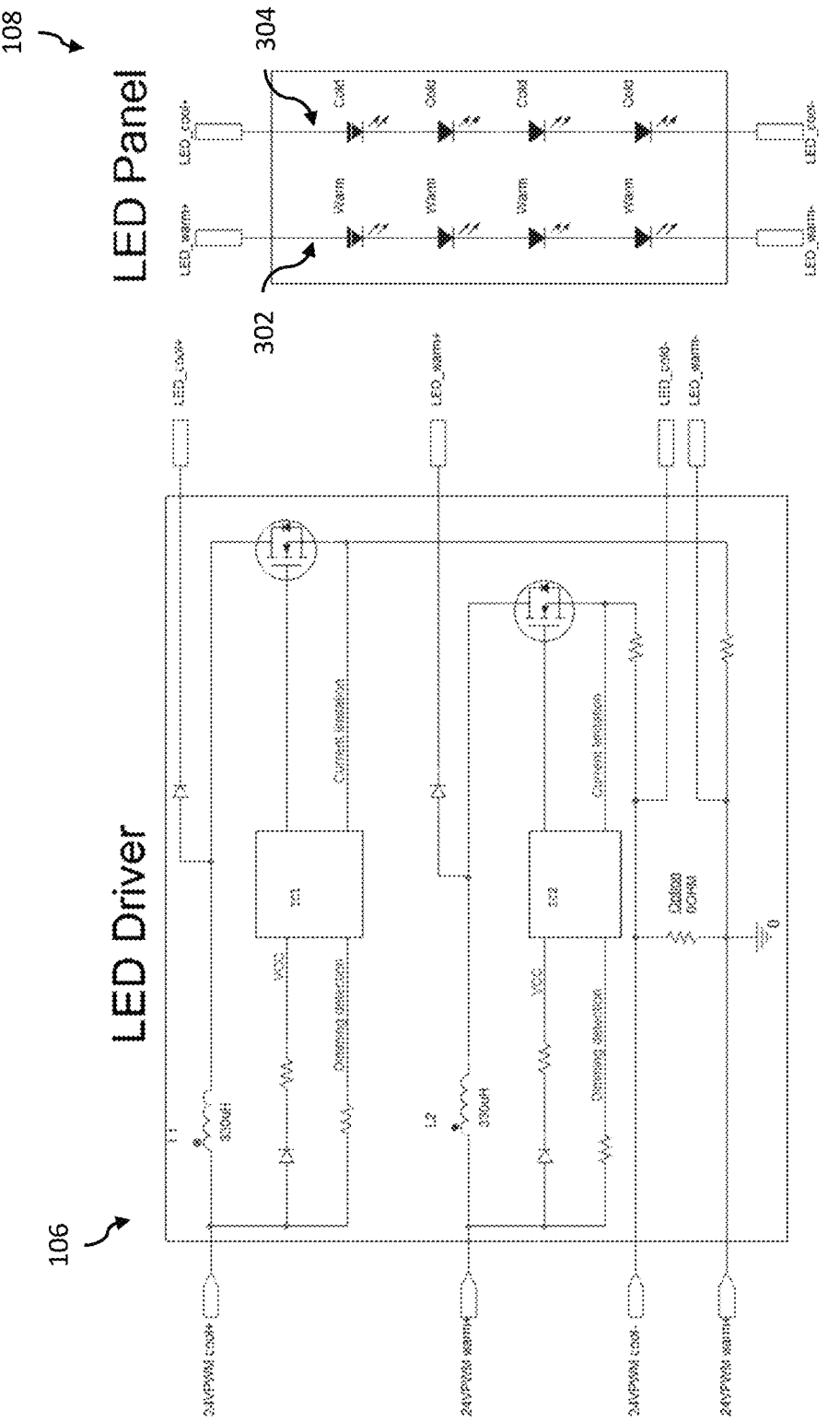
FIG. 3 is a diagram of an example driver circuit for a color-tunable lighting device and system described herein.
FIG. 4A is a diagram of an example lighting component for a color-tunable lighting device and system described herein.

FIG. 3 is a diagram of an example driver circuit 106 in accordance with the device and method described herein. The example driver circuit 106 illustrated is configured to control one lighting component 108, described further below. However, the driver circuit 106 may be configured to include additional control circuitry to control multiple lighting components 108, as indicated in FIG. 1. The driver circuit 106 receives four input signals (24 VPWM cool+, 24 VPWM warm+, 24 VPWM cool−, 24 VPWM warm) and creates/modulates four output currents (LED_cool+, LED_warm+, LED_cool−, LED_warm−) for controlling a first lighting element 302 and a second lighting element 304, described further below, of the lighting component 108. The input signals may be variable pulse width modulated (VPWM). As shown in the example the driver circuit 106, the input signals may be 24 VPWM.

Each input signal is connected to an integrated circuit (IC1, IC2), which are configured to detect a dimming event. Upon detecting the dimming event, the integrated circuit limits the current to the output signal, which consequently limits the current applied to the lighting component 108. As shown, the integrated circuits are IC1, IC2 configured to vary the current to the lighting elements 302, 304 of the lighting component 108 inversely to one another to create the desired color temperature, yet maintain and overall lumen output of the lighting component 108. For instance, input signals 24 VPWM cool+ and 24 VPWM warm− are used to generate current controls LED_cool+ and LED_warm−, while input signals 24 VPWM warm+ and 24 VPWM cool− are used to generate current controls LED_warm+ and LED_cool−.

The driver circuit 106 may be further expanded to include additional output currents to control color hue for lighting elements that include color, described further below.

FIG. 4A is a circuit diagram of an exemplary lighting component 108 according to the method and system described herein. The lighting component 108 includes a first lighting element 302, which may comprise a first bank of light emitting diodes (LEDs) having a warm color temperature. The lighting component 108 further includes a second lighting element 304, which may comprise a second bank of LEDs having a cool color temperature. Each bank of LEDs includes its own input and output current terminals which are connected to and driven by the driver circuit 106, via the current controls In some embodiments, the warm color temperature of the first lighting element may be from about 1000 K to about 4000 K. For instance, the color temperature of the first bank of LEDs may be about 3000 K. In some embodiments, the cool color temperature of the second lighting element may be from about 5000 K to about 7000 K. For instance, the cool color temperature of the second bank of LEDs may be about 6250 K. These ranges may be selected as desired to create the effect for the desired installation location.

Figure 4C:
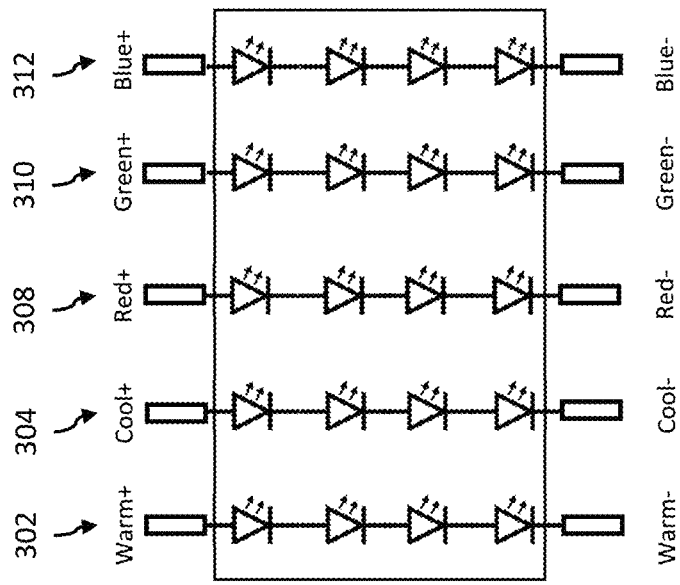
FIG. 4C is a diagram of another alternative lighting component for a color-tunable lighting device and system described herein that includes three additional lighting elements with a fully tunable color hue.
Figure 4B:
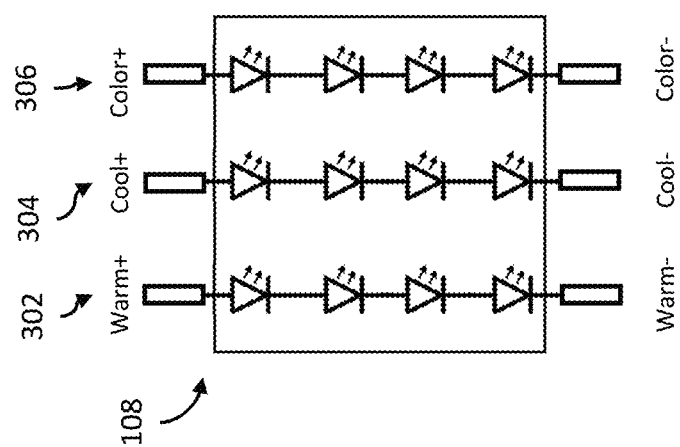
FIG. 4B is a diagram of an alternative example lighting component for a color-tunable lighting device and system described herein that includes a third lighting element with a limited range tunable color hue.

FIG. 4B is a circuit diagram of an exemplary lighting component 108 according to the method and system described herein. The lighting component 108 includes a first lighting element 302, which may comprise a first bank of LEDs having a warm color temperature. The lighting component 108 further includes a second lighting element 304, which may comprise a second bank of LEDs having a cool color temperature. The lighting component 108 further includes a third lighting element 306, which may comprise a third bank of LEDs having color LEDs with a desired hue, such as, but not limiting, red, green, blue LEDs. Each bank of LEDs includes its own input and output current terminals which are connected to and driven by the driver circuit 106, via the current controls. By varying the current input, the desired color temperature and color hue of a particular color may be controlled.

FIG. 4C is a circuit diagram of an exemplary lighting component 108 according to the method and system described herein. The lighting component 108 includes a first lighting element 302, which may comprise a first bank of LEDs having a warm color temperature. The lighting component 108 further includes a second lighting element 304, which may comprise a second bank of LEDs having a cool color temperature. The lighting component 108 further includes a third lighting element 308, which may comprise a third bank of LEDs having color LEDs with a desired hue, such as red. The lighting component 108 further includes a fourth lighting element 310, which may comprise a fourth bank of LEDs having color LEDs with a desired hue, such as green. The lighting component 108 further includes a fifth lighting element 312, which may comprise a fifth bank of LEDs having color LEDs with a desired hue, such as blue. Each bank of LEDs includes its own input and output current terminals which are connected to and driven by the driver circuit 106, via the current controls. By varying the current input to the red, green and blue LEDs 308, 310, 312, any color may be emitted. Further, by varying the current input to the warm and cool color LEDs 302, 304, any color temperature effect may be controller.

As will be discussed in greater detail below, the lighting component 108 may include an all-in-one, lighting fixture, where the luminaire is integrally built-into the fixture and lighting fixtures with removable luminaries, where the luminaire includes the lighting elements 302, 304.

FIGS. 5A-5C illustrate and example lighting fixture 400 that incorporates the lighting device and method described herein. The device 100 may be configured as a lighting fixture 400 to be installed in standard T-bar drop ceilings or hung with chain or cable 406 (as illustrated in FIG. 4C) and may include a frame 402. In some embodiments, the frame 302 may be ivory-white and powder-coated aluminum, although other colors, metals, plastics, and composites may be used. In some embodiments, the lighting fixture 400 may include an edge-lit diffuser 404 for smooth light distribution. In some embodiments, the lighting fixture 400 may be configured as 2'×2' or 2'×4' for replacing fluorescent ceiling fixtures. Where LEDs are used in the lighting elements 302, 304 of the lighting component 108, the lighting fixture 400 has significant advantages over fluorescent panels, including up to 50% energy cost savings. Further, the lighting fixture 400 may be made from fully recyclable materials, and unlike fluorescent panels, is mercury-free, has no noise or flickering, and no UV radiation.

As discussed in greater detail below, lighting fixture 400 may include one or more removable luminaires 116, that include one or more of the lighting elements 302, 304, permitting the lighting elements 302, 304 to be changed if they are defective or malfunctioning. Alternatively, the lighting elements 302, 304 may be built integrally into the lighting fixture 400, improving the economy of the manufacturing process.

Figure 6B:
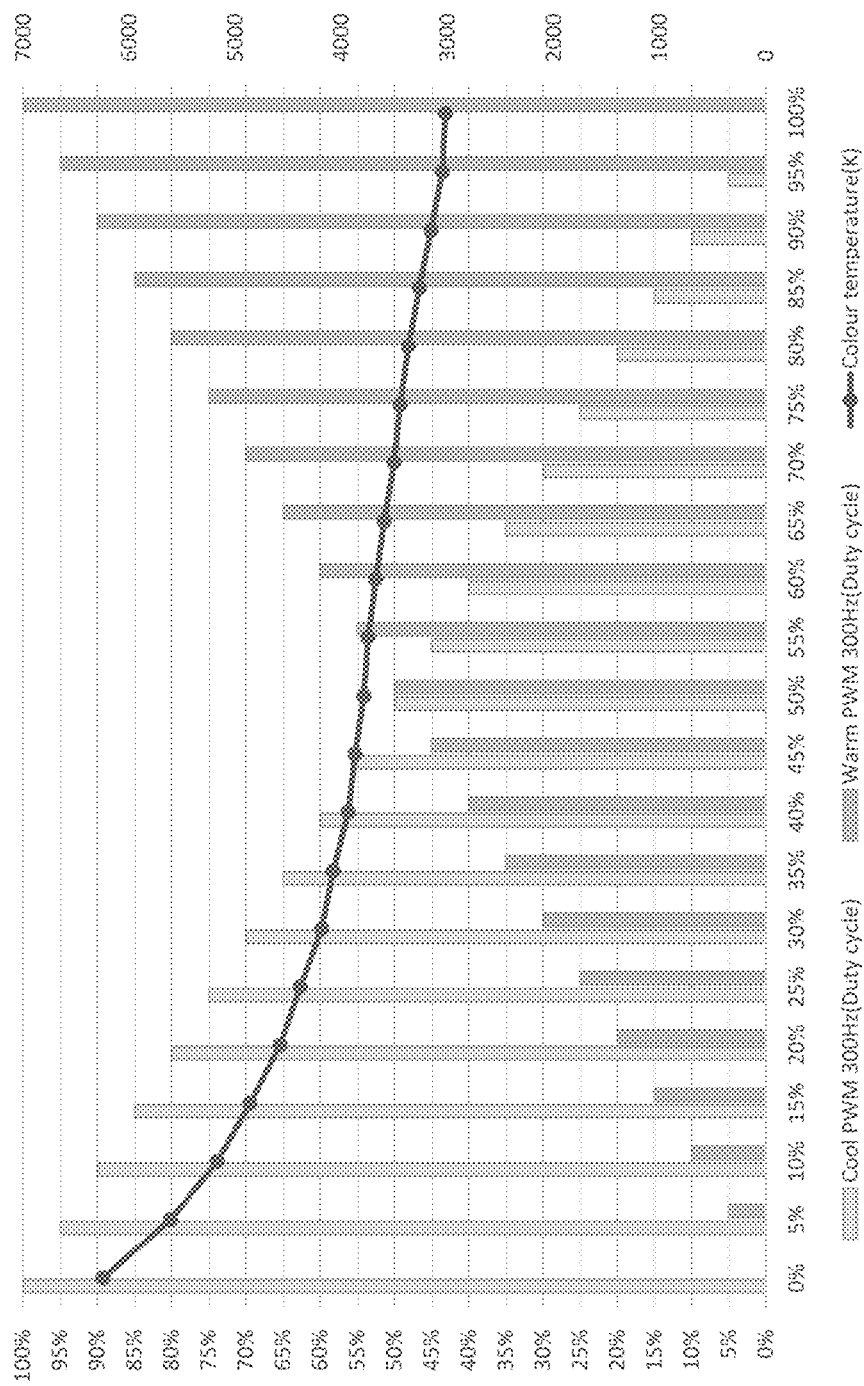
FIG. 6B is a chart illustrating the change in color-temperature versus power applied to the lighting elements of the lighting component.
Figure 6C:
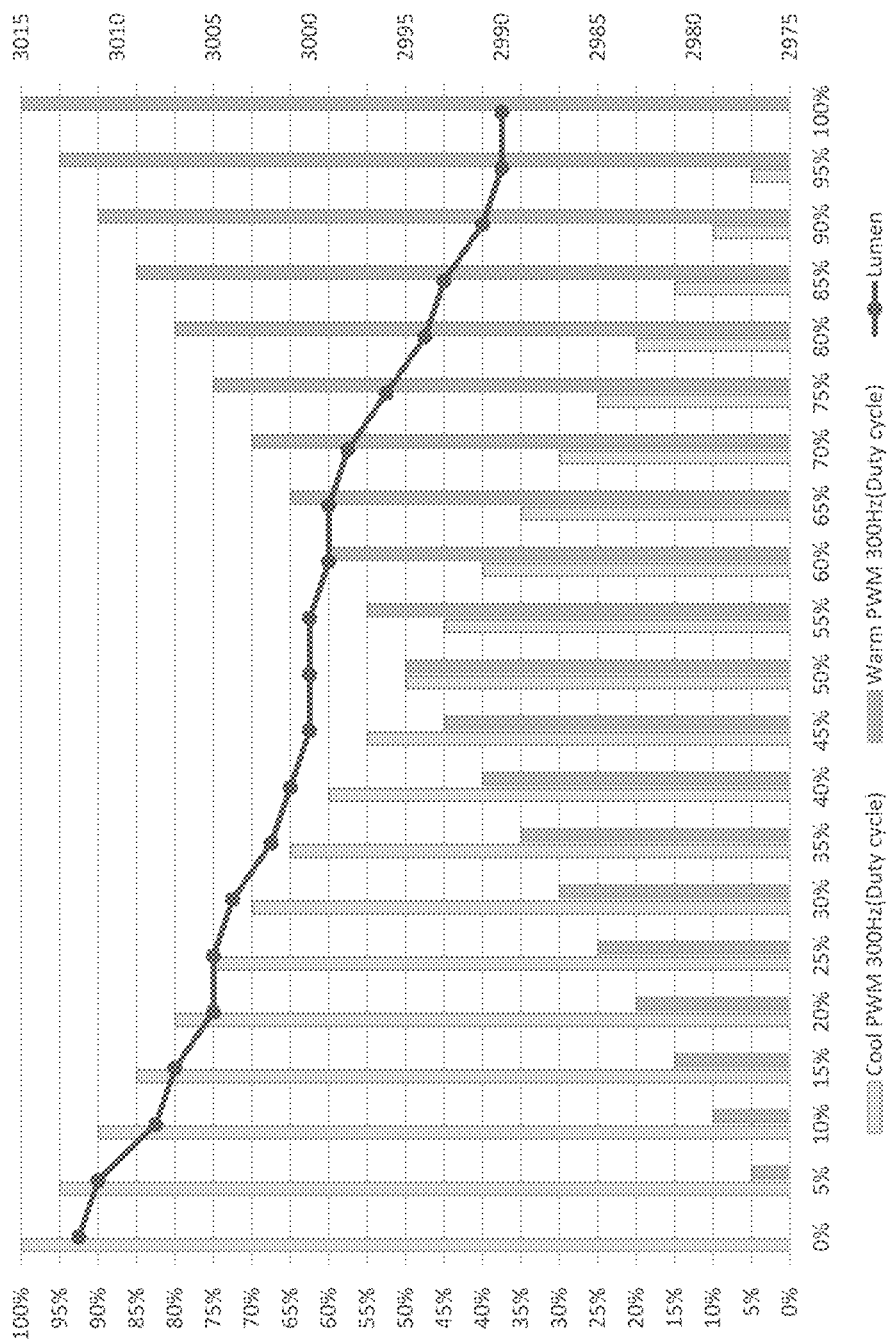
FIG. 6C is a chart illustrating the how the luminosity of the lighting component is maintained as the power applied to the lighting elements is changed.

FIGS. 6A-6C show charts illustrating an exemplary embodiment where the color temperature is tunable between about 3000 K and about 6000 K, and the combined lumen output is maintained between about 2990 to about 3015 lumens. However, it is important to note that the chart only reflects the particular LEDs selected for the first and second banks.

FIG. 6A is a chart showing example values of power applied to the first and second lighting elements and the resulting combined color temperature and output lumens of the lighting component. Change in the properties of the lighting component as driven by the driver circuit are best illustrated in FIGS. 6B and 6C, described further below.

FIG. 6B is a chart that illustrates the change in color-temperature versus power applied to the lighting elements of the lighting component based on the example values provide in the chart of FIG. 5C. In some embodiments, the combined color temperature of the first lighting element and the second lighting element is tunable between about 3000 K and about 6000 K, allowing a user to select a warm color temperature or cool temperature as desired.

FIG. 6C is a chart illustrating the how the luminosity of the lighting component is maintained as the power applied to the lighting elements is changed based on the values provided in the chart. In some embodiments, the combined lumen output of the first lighting element and the second lighting element may vary between about 2990 to about 3015 lumens. In one embodiment, the combined lumen output of the first lighting element and the second lighting element may be about 3000 lumens. As can be seen in the example, even though the color temperature may vary from warm to cool, the brightness of the lighting device (i.e. lumen output) is maintained relatively the same.

Figure 7A:
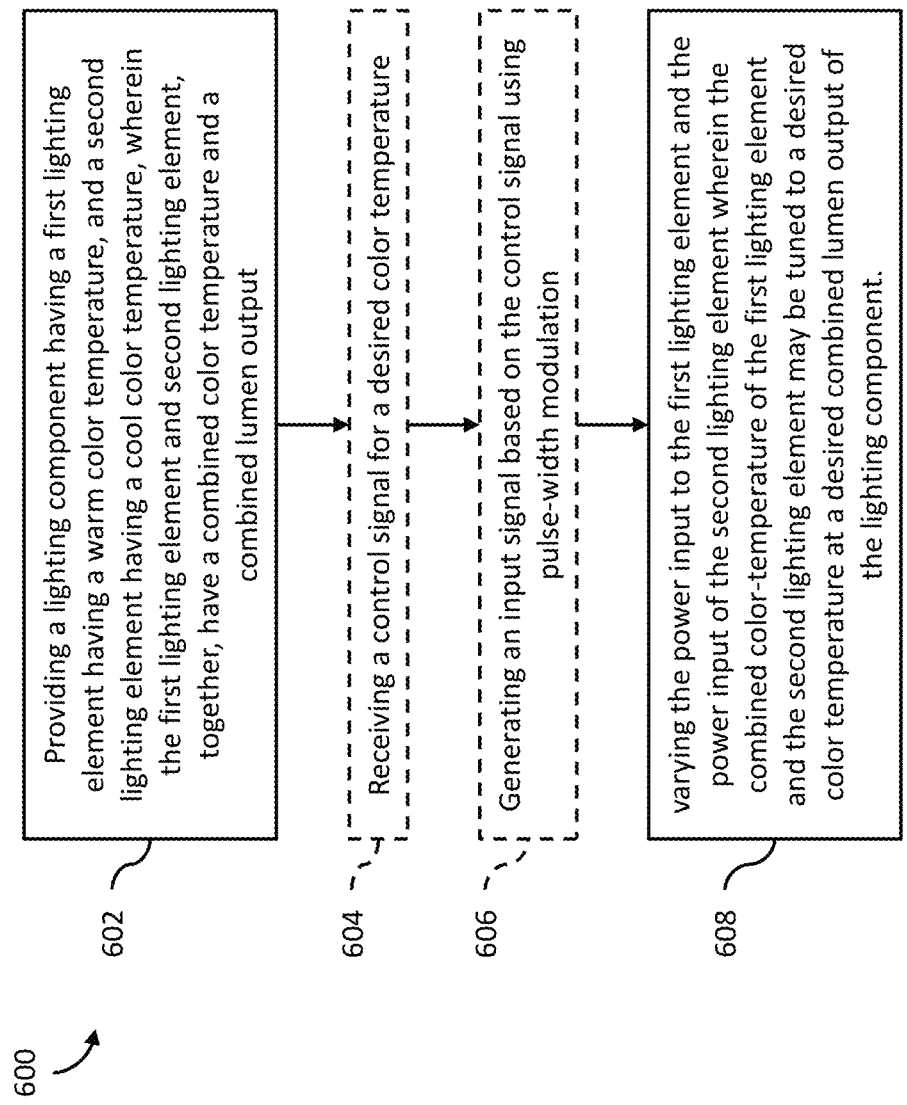
FIG. 7A is a flowchart of an example method of tuning the color temperature of a lighting device of the embodiment illustrated in FIG. 4A.

FIG. 7A is a flow chart of an example method 600 of tuning the color temperature of a lighting device 100 (block 602). In a step, a control signal may optionally be received for a desired color temperature (block 604). For example, controller 102 may receive a control input from one of the wireless control interface 110, analog wire control interface 112 and/or digital wire control interface 114.

As shown in FIG. 7A, the power input is varied to the first lighting element inversely with the power input of the second lighting element wherein the combined color-temperature of the first lighting element and the second lighting element may be tuned to a desired color temperature while maintaining light output of the lighting component (block 608). For example, driver circuit 106 may receive the 24 VPWM input signals from the controller 102 and modulate the current controls as shown in FIGS. 2 and 5A-5C.

As further shown in FIG. 7A, an input signal may optionally be generated based on the control signal using pulse-width modulation (block 606). For example, controller 102 may generate an input signal via variable pulse-width modulation.

Figure 7B:
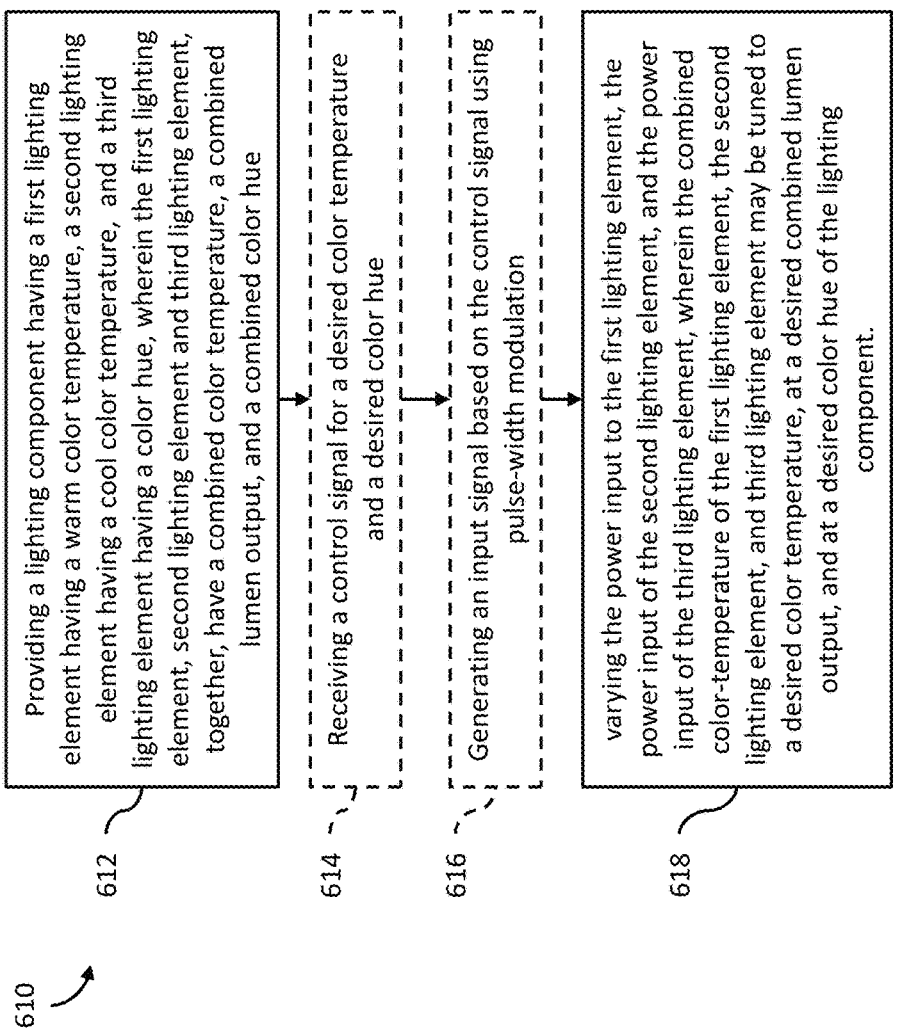
FIG. 7B is a flowchart of another example method of tuning the color temperature and color hue of a lighting device of the embodiment illustrated in FIG. 4B.

FIG. 7B is a flow chart of an example method 610 of tuning the color temperature of a lighting device 100 with a third bank of LEDs having a particular color hue, as illustrated in FIG. 4B (block 612). In a step, a control signal may optionally be received for a desired color temperature and color hue (block 614). For example, controller 102 may receive a control input from one of the wireless control interface 110, analog wire control interface 112 and/or digital wire control interface 114. Similar to the embodiment illustrated in FIG. 7A, a control signal may optionally be received for a desired color temperature and color hue (block 614). Further, an input signal may optionally be generated based on the control signal using pulse-width modulation (block 616).

As shown in FIG. 7B, the power input is varied between the first lighting element and the power input of the second lighting element wherein the combined color-temperature of the first, second and third lighting elements may be tuned to a desired color temperature and color hue at a desired light output of the lighting component 100 (block 618). Further, the power input to the third lighting element may be tuned to a desired color hue of a particular color. The lumen output of the third lighting element is factored into the combined lumen output of the lighting component 100 via the controller 102.

Figure 7C:
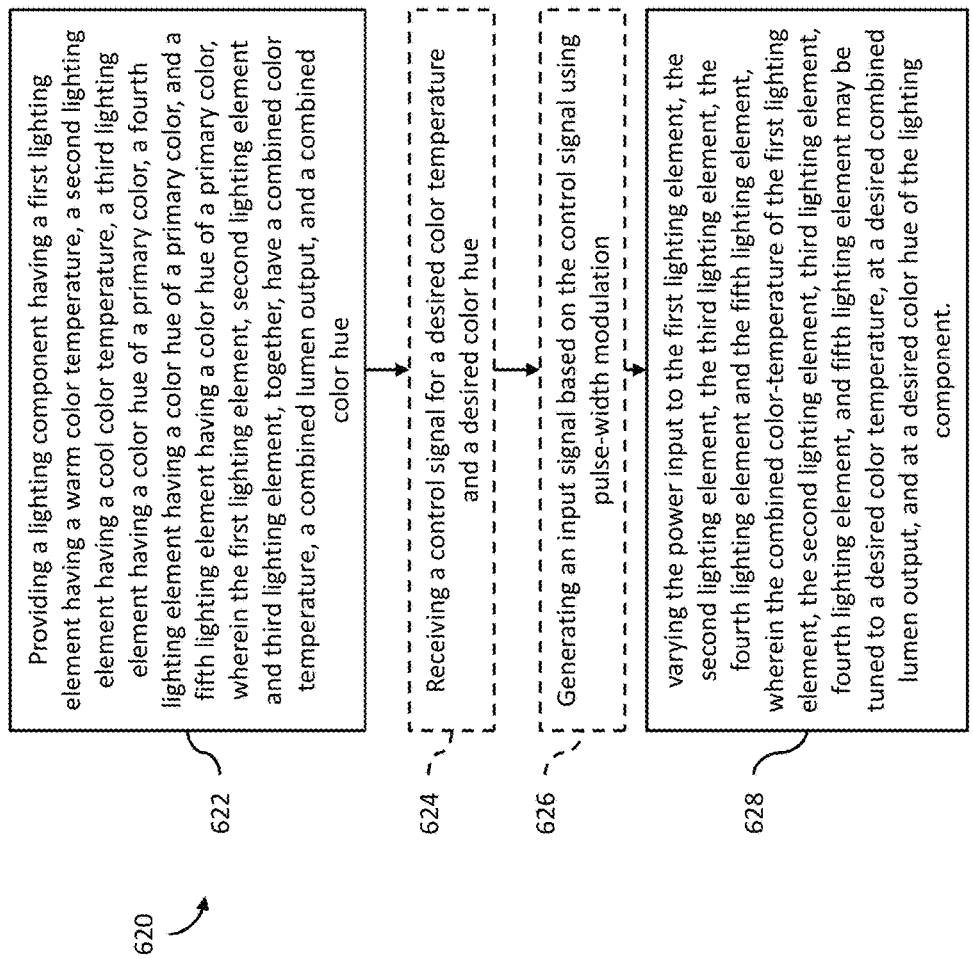
FIG. 7C is a flowchart of other of another example method of tuning the color temperature color hue of a lighting device of the embodiment illustrated in FIG. 4C.

In an alternative method, illustrated in FIG. 7C at 620, in addition to the use of a first lighting element and second lighting element to control lumen output and color temperature of the lighting component 100, three additional lighting elements, as shown in FIG. 4C, may be controlled to select any color hue (block 622). The third, fourth, and fifth lighting elements are preferably selected from the group consisting of primary colors. Similar to the embodiment illustrated in FIG. 7A, a control signal may optionally be received for a desired color temperature and color hue (block 624). Further, an input signal may optionally be generated based on the control signal using pulse-width modulation (block 626). Through modulation of the lumen output of all five elements, any color hue, brightness and color temperature may be achieved (block 628). While the overall warmth or coolness of the emitted light may be further tuned with the first and second lighting elements, the fourth, fifth and sixth elements are modulated to achieve the desired color hue. The lumen output of the first, second, third, fourth and fifth lighting elements are factored together to calculate the combined lumen output of the lighting component 100 via the controller 102 to achieve the desired lumen output.

FIGS. 8A-8E illustrate alternative configurations of the color-tunable lighting device and system, which will be described in greater detail below.

Figure 8A:
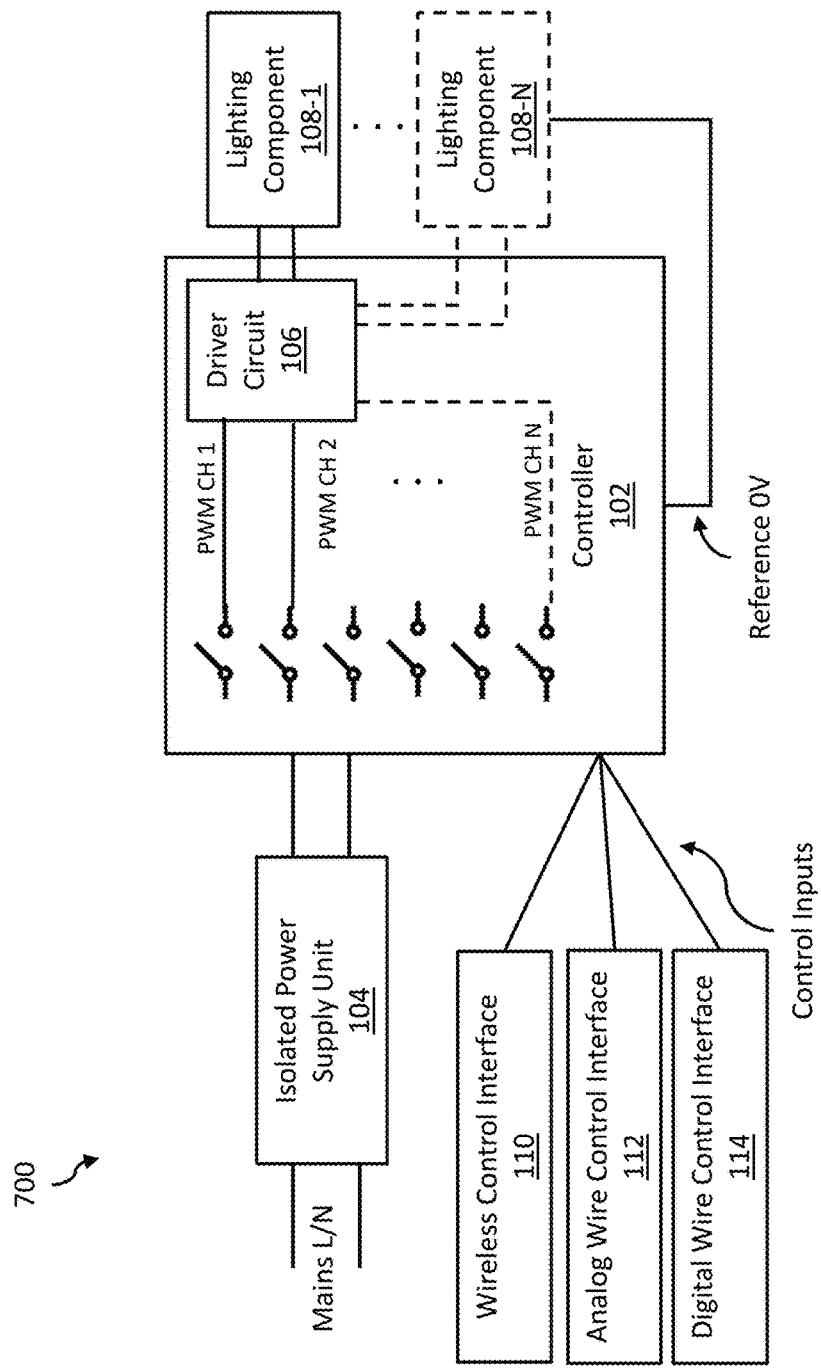
FIG. 8A is a diagram of an overview of a first alternative embodiment of the color-tunable lighting device and system described herein where the driver circuit is integrated with the controller.

FIG. 8A is a diagram of a first alternative embodiment 700 of a color-tunable lighting device and system. In the first alternative embodiment 700, the driver circuit 106 is integrated with the controller 102.

Figure 8B:
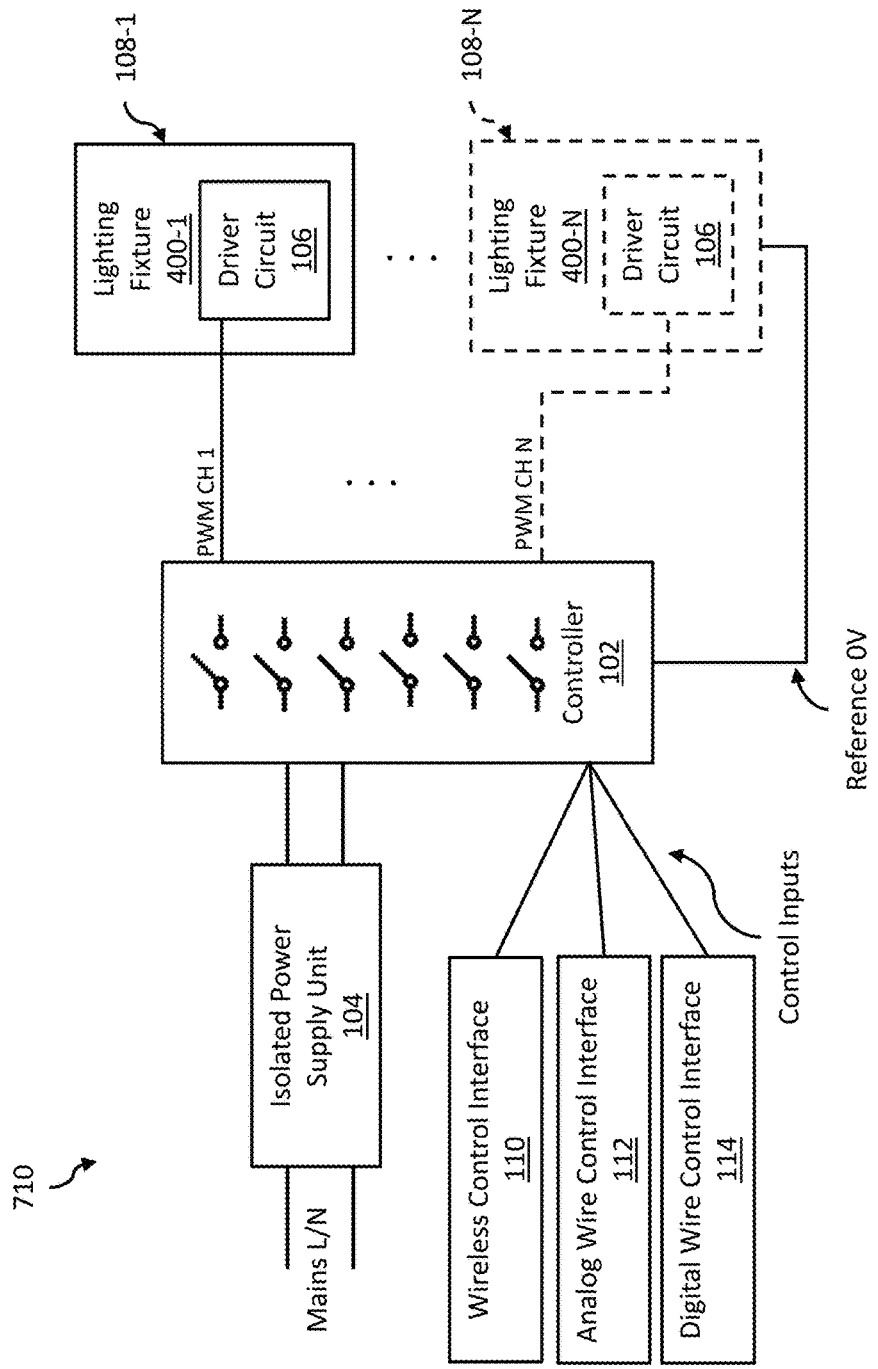
FIG. 8B is a diagram of an overview of a second alternative embodiment of the color-tunable lighting device and system described herein where the driver circuit is integrated with the lighting component.

FIG. 8B is a diagram of a second alternative embodiment 710 of a color-tunable lighting device and system where the lighting component 108 comprises a lighting fixture 400 having an integrated driver circuit 106.

Figure 8C:
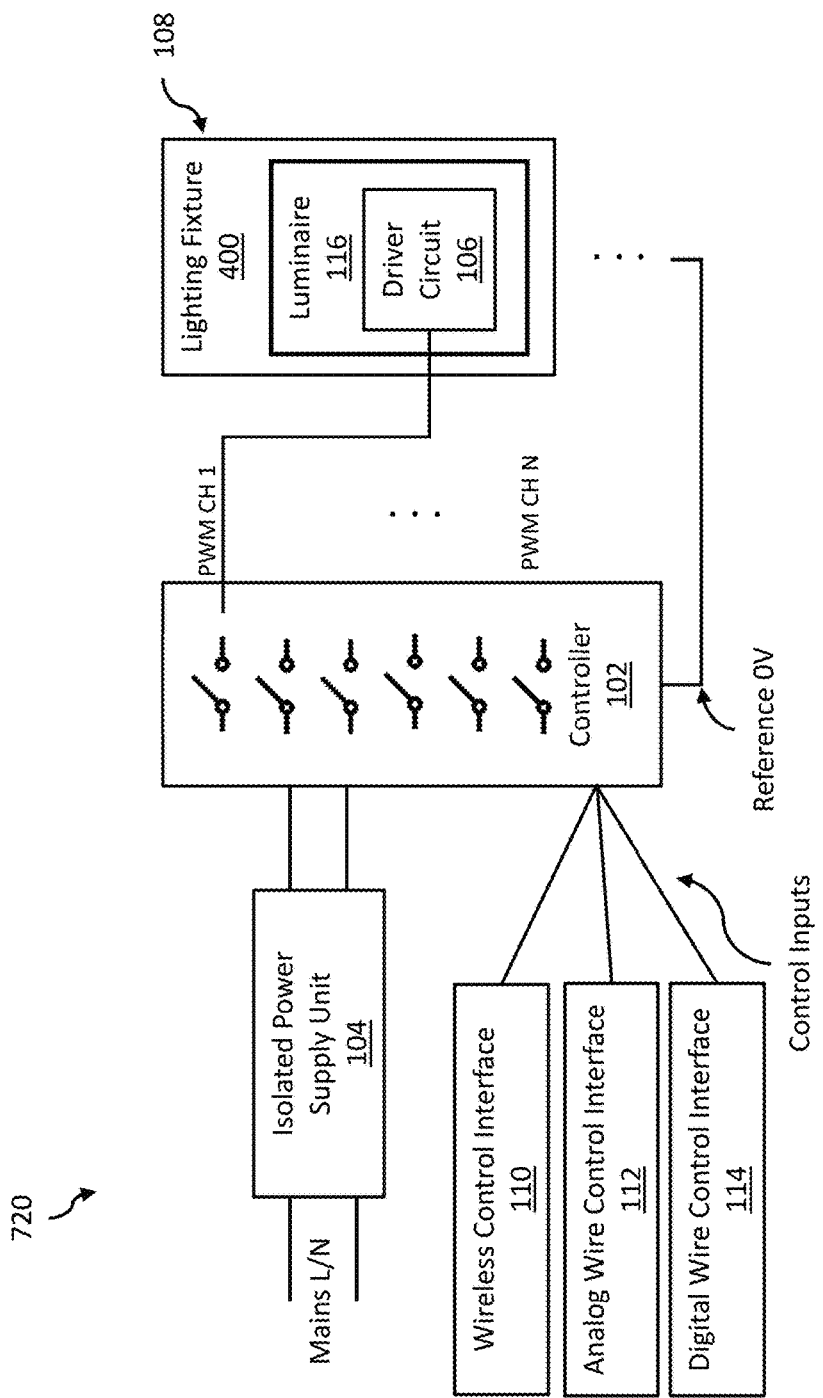
FIG. 8C is a diagram of an overview of a third alternative embodiment of the color-tunable lighting device and system described herein where the driver circuit is integrated with a luminaire installed in the lighting component.

FIG. 8C is a diagram of a third alternative embodiment 720 of a color-tunable lighting device and system where the lighting component 108 comprises a lighting fixture 400 with a removable luminaire 116 with an integrated driver circuit 106.

Figure 8D:
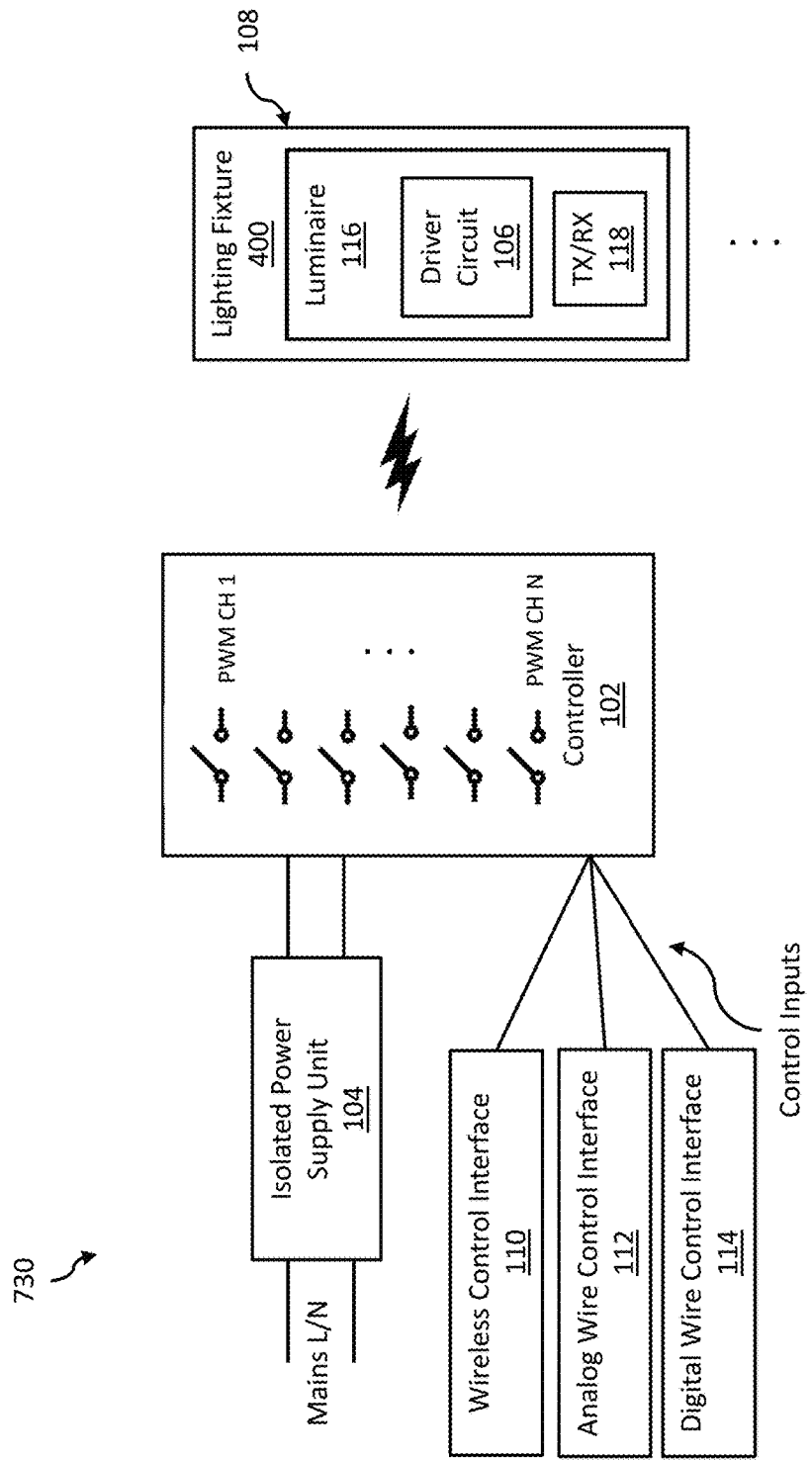
FIG. 8D is a diagram of an overview of a fourth alternative embodiment of the color-tunable lighting device and system described herein where the controller communicates wirelessly to the driver circuit via the luminaire.
Figure 8E:
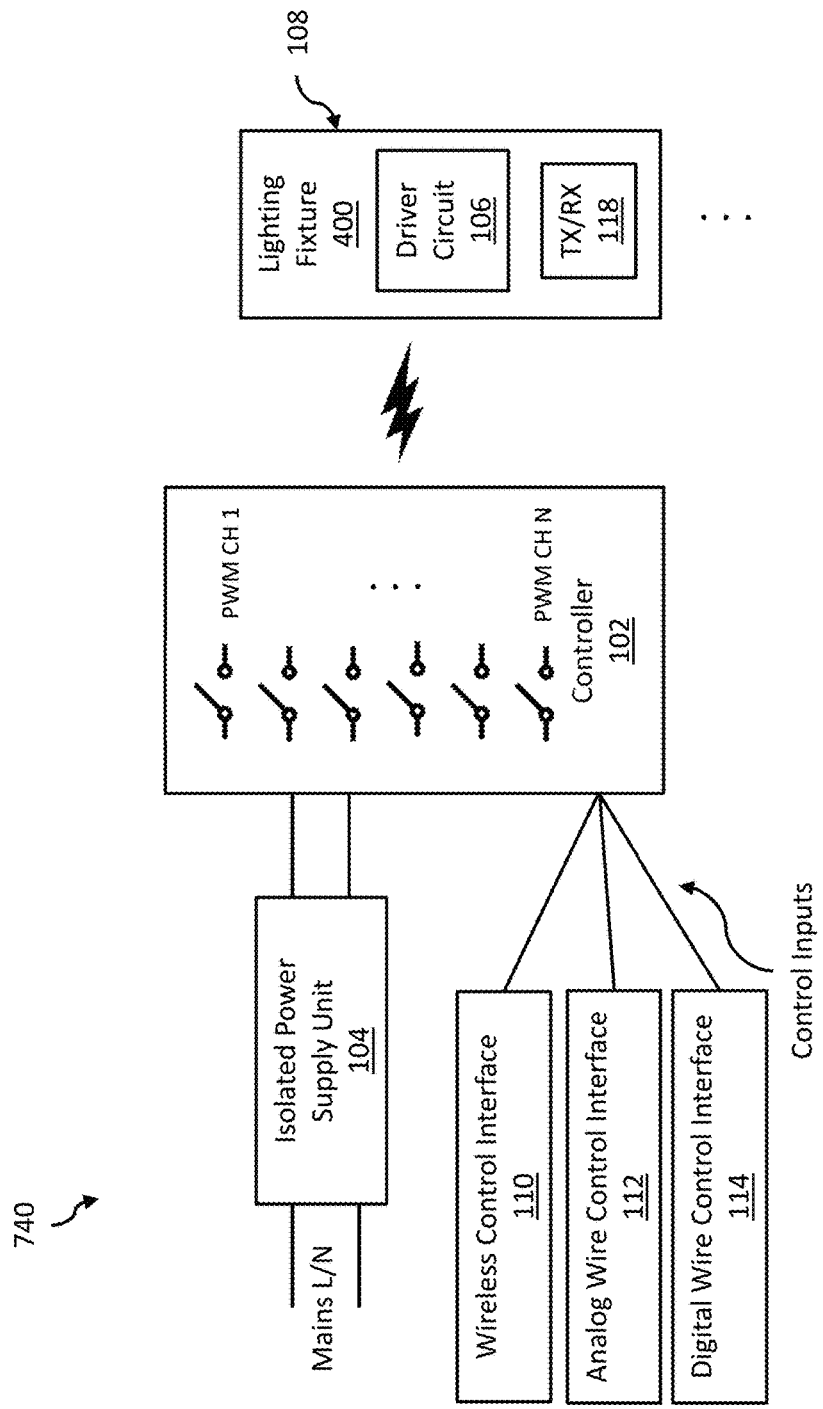
FIG. 8E is a diagram of an overview of a fifth alternative embodiment of the color-tunable lighting device and system described herein where the controller communicates wirelessly to the driver circuit via the lighting component.

As shown in FIGS. 8D and 8E, fourth and fifth alternative embodiments 730, 740 illustrate that the controller 102 may be configured to communicate wirelessly through wireless control interface 110 with the driver circuit 106. In FIG. 8D, the fourth alternative embodiment 730 shows a lighting fixture 400 having a removable luminaire 116 that includes the driver circuit 106 and a wireless communication interface 118 configured to communicate with wireless control interface 110 of the controller 102.

In FIG. 8E, the fifth alternative embodiment 740 where the lighting component 108 is a lighting fixture 400 having an integrated driver circuit 106 and wireless communication interface 118 configured to communicate with wireless control interface 110 of the controller 102.

Wireless communication interface 116 may include IEEE 802.11, Bluetooth, and/or other RF communications methods, such as ZigBee (IEEE 802.15.4) and Z-Wave and the like.

Therefore, it can be seen that the lighting device described herein provides a unique solution to the problem of providing a color-tunable lighting device that permits a user to adjust the color temperature to a desired effect while maintaining the brightness.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A color-tunable lighting device, comprising:
   a lighting component having a first lighting element having a warm color temperature, and a second lighting element having a cool color temperature, wherein the first lighting element and second lighting element, together, have a combined color temperature and a combined lumen output; and
   a controller configured to control power to the first lighting element and the second lighting element wherein the combined color-temperature of the first lighting element and the second lighting element may be tuned to a desired color temperature at a desired combined lumen output of the lighting component,
   wherein the controller is further configured and arranged to inversely adjust the current to the first lighting element and the second lighting element while maintaining the lumen output of the lighting component during a color change event.

2. The device of claim 1, wherein the controller is still further configured to selectively reduce the combined lumen output during a dimming event.

3. The device of claim 1, further comprising a third lighting element comprising a color LED, wherein the first, second and third lighting elements have a combined color temperature, a combined lumen output and combine color hue; and where the controller is further configured to tune the color hue of the third lighting element to a desired color hue.

4. The device of claim 3, further comprising a fourth bank of LEDS and a fifth bank of LEDS; wherein the third, fourth and fifth bank of LEDS comprise a different primary color; and wherein the controller is configured to selectively control the color hue of the third, fourth, and fifth lighting elements, independently, to emit a desired color hue.

5. The device of claim 1, wherein the combined color temperature of the first lighting element and the second lighting element varies between about 3000 K and about 6000 K.

6. The device of claim 1, wherein the warm color temperature of the first lighting element is from about 1000 K to about 4000 K.

7. The device of claim 1, wherein the cool color temperature of the second lighting element is from about 5000 K to about 7000 K.

8. The device of claim 1, wherein the controller is configured to receive a control input from the group consisting of wired, wireless, and internet input sources.

9. A method of tuning the color of a color-tunable lighting device, comprising:
   providing a lighting component having a first lighting element having a warm color temperature, and a second lighting element having a cool color temperature, wherein the first lighting element and second lighting element, together, have a combined color temperature and a combined lumen output; and
   varying the power input to the first lighting element and the power input of the second lighting element wherein the combined color-temperature of the first lighting element and the second lighting element may be tuned to a desired color temperature at a desired combined lumen output of the lighting component,
   wherein during a color change event, the current is inversely varied between the first lighting element and second lighting element to create a desired color temperature and maintaining a constant lumen output.

10. The method of claim 9, further comprising selecting the combined lumen output.

11. The method of claim 9, wherein lighting component further comprises a third lighting element having a color hue; the method further comprising selecting the color hue of the third lighting element.

12. The method of claim 11, wherein the lighting component further comprises a fourth lighting element and a fifth lighting element, the third, fourth and fifth lighting elements configured to emit light selected from the group consisting of primary colors; the method further comprising varying the power input to the third, fourth and fifth lighting elements to emit a desired color hue.

13. The method of claim 9, further comprising receiving a control signal for a desired color temperature.

14. The method of claim 13, further comprising generating an input signal based on the control signal using a pulse-width modulation.

15. The method of claim 9, wherein the combined color temperature of the first lighting element and the second lighting element varies between about 3000 K and about 6000 K.

16. The method of claim 9, wherein the cool color temperature of the second lighting element is from about 5000 K to about 7000 K.

* * * * *